United States Patent [19]
Eldridge et al.

[11] Patent Number: 6,094,721
[45] Date of Patent: Jul. 25, 2000

[54] METHOD AND APPARATUS FOR PASSWORD BASED AUTHENTICATION IN A DISTRIBUTED SYSTEM

[75] Inventors: Alan D. Eldridge, Hollis, N.H.; Charles W. Kaufman, Northborough, Mass.

[73] Assignee: International Business Machines Corporation, Armonk, N.Y.

[21] Appl. No.: 08/961,630

[22] Filed: Oct. 31, 1997

[51] Int. Cl.[7] .................................................. H01J 13/00
[52] U.S. Cl. .................... 713/168; 714/57; 235/382.5
[58] Field of Search ................. 380/21, 25; 713/168; 235/382.5

[56] References Cited

U.S. PATENT DOCUMENTS

| | | | |
|---|---|---|---|
| 4,758,718 | 7/1988 | Fujisaki et al. | 235/487 |
| 4,868,877 | 9/1989 | Fischer | 380/25 |
| 4,876,716 | 10/1989 | Okamoto | 380/21 |
| 5,253,295 | 10/1993 | Saada et al. | 380/23 |
| 5,276,735 | 1/1994 | Boebert et al. | 380/21 |
| 5,442,342 | 8/1995 | Kung | 380/825.34 |
| 5,513,261 | 4/1996 | Maher | 380/23 |
| 5,544,322 | 8/1996 | Cheng et al. | 395/200.12 |
| 5,606,663 | 2/1997 | Kadooka | 395/188.01 |
| 5,611,048 | 3/1997 | Jacobs et al. | 395/200.09 |
| 5,862,323 | 1/1999 | Blakley, III et al. | 395/188.01 |
| 5,915,019 | 6/1999 | Ginter et al. | 380/4 |

*Primary Examiner*—Tod R. Swann
*Assistant Examiner*—Todd Jack
*Attorney, Agent, or Firm*—Kudirka & Jobse, LLP

[57] ABSTRACT

A method and apparatus for updating the password status of one or more servers in a client/server environment utilizes multiple passwords associated with a client process, including a current password and one or more non-current passwords. Each password has associated therewith a key and a key identifier. If upon an attempted access, a server process challenges the client process with a non-current key identifier, the client process provides the corresponding key associated with the non-current password. Once access to the server is achieved, the key identifier associated with the current password is supplied to the server process by the client process. In a networked server environment, the updated server process may provide the updated key identifier to other server processes which have knowledge of the client profile.

26 Claims, 9 Drawing Sheets

METHOD AND APPARATUS FOR PASSWORD BASED AUTHENTICATION IN A DISTRIBUTED SYSTEM

RELATED APPLICATIONS

This application is the one of two U.S. patent applications filed on an even date herewith and commonly assigned, including Ser. No. XX/XXX,XXX, Attorney Docket No. L09-97-016, by Charles W. Kaufman and Alan D. Eldridge, entitled "Removable Media Apparatus for Password Based Authentication in a Distributed System", the subject matter of which is incorporated herein by this reference.

FIELD OF THE INVENTION

The present invention relates, in general, to data processing systems, and more specifically, to a data processing system requiring password authentication to access.

BACKGROUND OF THE INVENTION

In a client/server computer environment, multiple client processes are coupled, typically through a network configuration, to one or more server processes. The server processes may comprise a dedicated process which performs a specific service such as providing access to a database or a network.

Typically, a client process wishing to access a server process must comply with an authentication protocol before access is granted. Many authentication protocols are based on passwords or password-derived information. Problems arise, however, when a client process modifies or changes its password, a server process does not yet have knowledge of a changed password. As a result, access to the server process may be denied until the server is updated with the information related to the password. In a multiple server environment, multiple denials as well as multiple updating procedures may result. Such a result is undesirable for a number of reasons.

In addition, the nature and format of the information related to the passwords may not be completely secured. A user selects a password which is then used to generate a binary value, i.e., a key. Specifically, when a user changes passwords the key traditionally does not change. Instead, the new password is used to encrypt the key which is then stored within a client identification file. If an impostor obtains both the identification file and the user password, subsequent of changing of passwords will not prevent the impostor from impersonating the user.

Accordingly, a need exists for a method and apparatus in which changing the password associated with a client process results in generation of a new key and new key identifiers which can be provided to secure server processes to defeat unauthorized use of a client profile.

A need further exists for a method in which providing a key identifier to a server process results in subsequent updating of other secure processes or servers having knowledge of that particular client process.

An additional need exists for a removable media apparatus which contains both current and noncurrent information associated with a client process which may be used to update a secure server process with the most current data during the authentication process.

SUMMARY OF THE INVENTION

The above and other objects are achieved in accordance with the present invention which provides a method and apparatus which may be used to complement existing authorization protocols, particularly in a client/server environment. According to the invention, a client process contains secret information either associated with or derived from a current password and one or more previous passwords. A server process contains information derived from one of the passwords, such information sufficient to execute an authentication protocol in which the client process must prove knowledge of the secret information derived from the corresponding password. The server process provides information to the client process sufficient for the client process to tell whether information associated with a current or a previous password is expected by the server. The client process authenticates to the server process based on the secret information the server expects, and, if secret information relating to a non-current password is used, the client process communicates to the server process the secret information corresponding to the current password. A server process receiving the secret information associated with a current password may update other server processes within the same logical domain. The secret information retained by the client process may be stored on a portable medium capable of interfacing with appropriate computer peripheral devices.

According to one aspect, the invention provides an apparatus for password authentication comprising identification logic configured to maintain a plurality of keys associated with a client process, one of the keys designated as current, access logic configured to determine if one of the keys corresponds to authentication data with which a server process challenged an access attempt by the client process, and update logic configured to provide a current key identifier to the server process, if the authentication data did not correspond to the current key. In one embodiment, the identification logic further comprises logic configured to associate a plurality of passwords with the client process, one of the passwords being designated as current. Logic is further provided for at least partially deriving a key from each of the passwords and for generating a key identifier from each of the keys. In another embodiment, the keys comprise an encryption key pair having a private key component and a public key component.

According to a second aspect of the invention, a method for authenticating passwords in a computer system comprises the steps of associating with a first process a plurality of keys, one of the keys being designated as current, presenting one of the keys to a second process, the key corresponding to authentication data with which the second process challenged the first process, and supplying to the second process a key identifier associated with the current key, if the second process presented authentication data corresponding to other than the current key. In one embodiment, the process further comprises the steps of associating with the client process a plurality of passwords, generating a key from each of the passwords, and generating a key identifier from each of the keys. According to another embodiment, the method further includes the step of determining whether the server process is logically associated with another server to which the client process has previously supplied the key identifier associated with the current key.

In accordance with a third aspect of the present invention, a computer program product for use with a computer system comprises a computer useable medium having program code embodied therein, the program code comprising code for associating with a first process a plurality of keys, one of the keys designated as current, program code responsive to an authorization challenge from a second process for supplying one of the keys to the second process, the one key corresponding to authorization data with which the second process presented the authorization challenge, and code for supplying to the second process a key identifier associated with the current key, if the second process presented authentication data corresponding to other than the current process.

BRIEF DESCRIPTION OF THE DRAWINGS

The above and other features, objects, and advantages of the invention will be better understood by referring to the following description in conjunction with the accompanying drawing in which.

DETAILED DESCRIPTION

Figure 1:
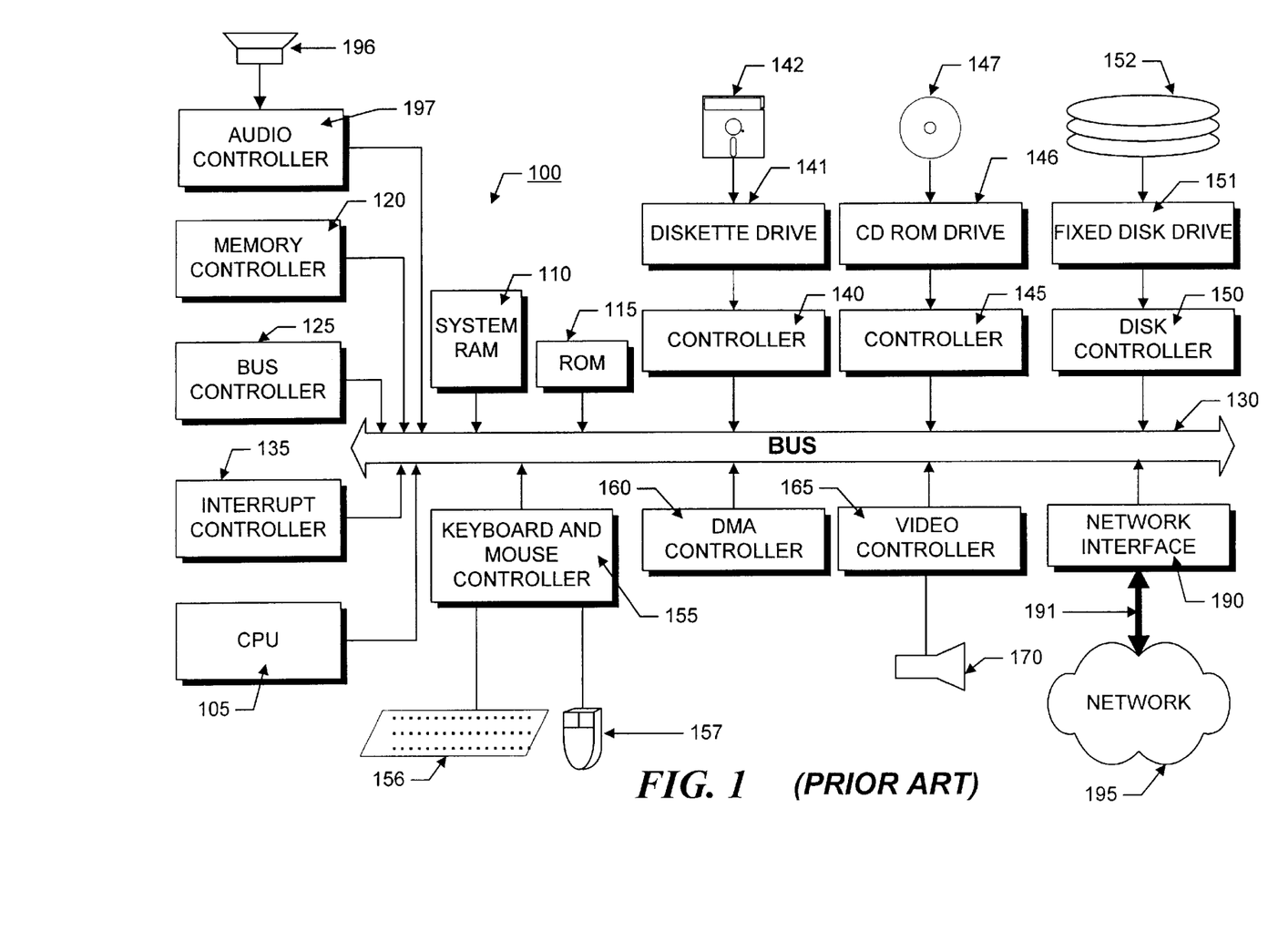
FIG. 1 is a block diagram of a computer systems suitable for use with the present invention.

FIG. 1 illustrates the system architecture for a computer system 100, such as an IBM PS/2® computer on which the invention can be implemented. The exemplary computer system of FIG. 1 is for descriptive purposes only. Although the description below may refer to terms commonly used in describing particular computer systems, such as an IBM PS/2 computer, the description and concepts equally apply to other systems, including systems having architectures dissimilar to FIG. 1.

The computer system 100 includes a central processing unit (CPU) 105, which may include a conventional microprocessor, a random access memory (RAM) 110 for temporary storage of information, and a read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components. Mass storage may be provided by diskette 142, CD ROM 147 or hard drive 152. Data and software may be exchanged with computer system 100 via removable media such as diskette 142 and CD ROM 147. Diskette 142 is insertable into diskette drive 141 which is, in turn, connected to bus 130 by a controller 140. Similarly, CD ROM 147 is insertable into CD ROM drive 146 which is connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. It will be obvious to those reasonably skilled in the art that other input devices such as a pen and/or tablet and a microphone for voice input may be connected to computer system 100 through bus 130 and an appropriate controller/software. DNA controller 160 is provided for performing direct memory access to system RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Computer system 100 is generally controlled and coordinated by operating system software, such the OS/2® operating system, available from International Business Machines Corporation, Boca Raton, Fla. The operating system controls allocation of system resources and performs tasks such as process scheduling, memory management, and networking and I/O services, among other things.

Figure 2:
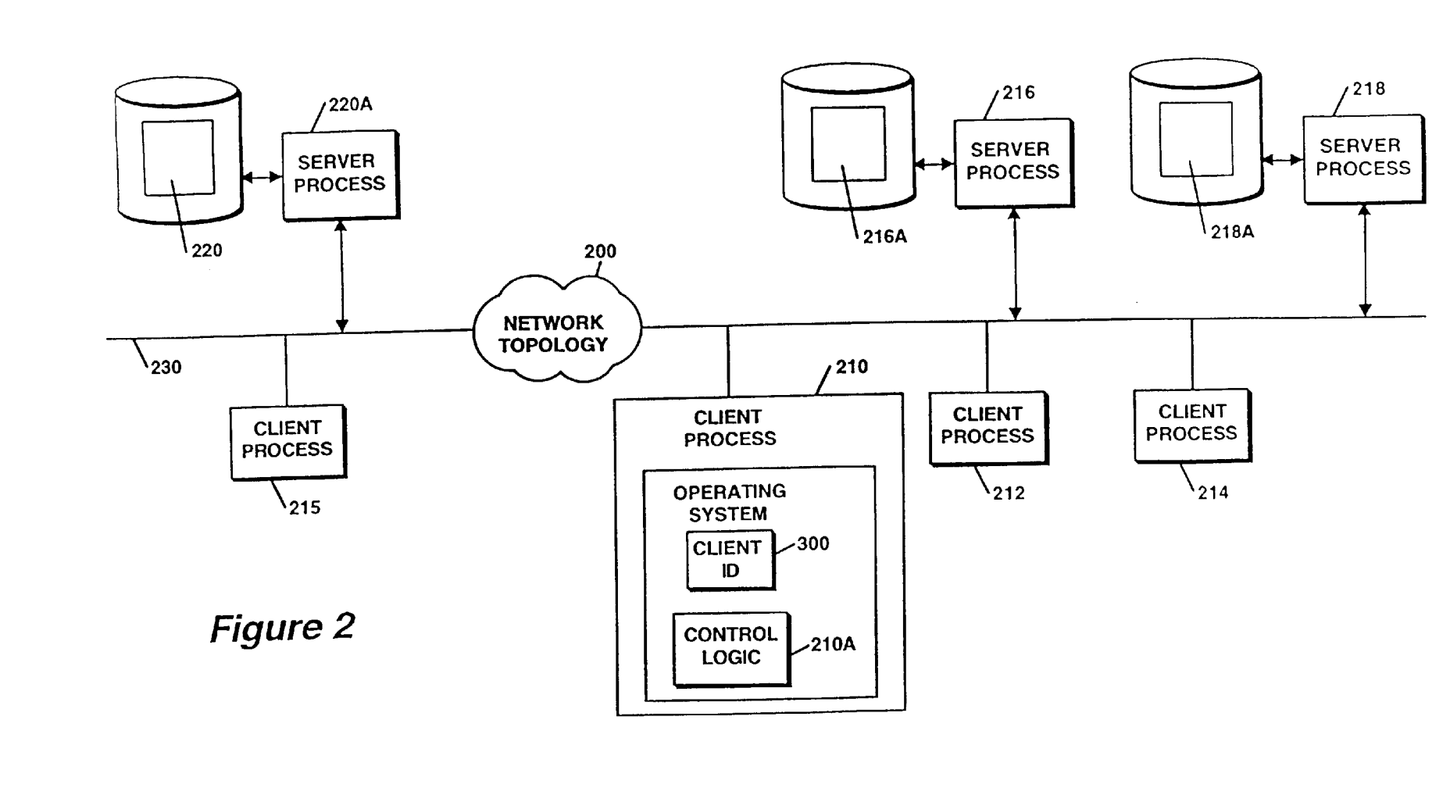
FIG. 2 is a conceptual illustration of a client/server environment in which the present invention may be utilized.

Referring to FIG. 2, a client/server environment in which the present invention may be utilized is illustrated conceptually. A network topology may be comprised of local area networks (LAN) 225 and 230 interconnected through a global computer network 200, such as the Internet. Logically interconnected to LAN 225 are client processes 210, 212, and 214, and secure server processes 216 and 218. Similarly, client process 215 is logically coupled to secure server process 220 through LAN 230. In the illustrative embodiment, each of the client processes and secure server processes may be implemented utilizing a computer architecture similar to illustrated with reference to FIG. 1 and an operating system such as OS/2. In addition, client processes 210–215 may be executing other client software applications such as Lotus® Notes®, commercially available from Lotus Development Corporation, Cambridge, Mass., into which the functionality of the present invention may be implemented. In the illustrative embodiment, client process 210 is shown executing an operating system and containing control logic 210A which embodies the functionality as described hereafter for performing the functions set forth in FIGS. 3B, 4 and 5. Each server process similarly contains control logic which embodies the complementary server functions of the invention as described herein, as well as the functions described with reference to FIGS. 7 and 8. Each of server processes 216, 218, and 220 is illustrated as having an accompanying directory services database 216A, 218A, and 220A, respectively. Each of database 216A, 218A, and 220A, contains client process identifiers and accompanying authentication data. In the illustrative embodiment, the client process identifiers may comprise the user name while the authentication data may comprise a hash or message digest of a key associated with that client process or other data as will be described in greater detail hereinafter. Although multiple servers are shown, the invention may be practiced in any client/ server environment consisting of at least one client process and at least one server process logically connected through a private or public network topology.

Identification File Structure

Figure 3A:
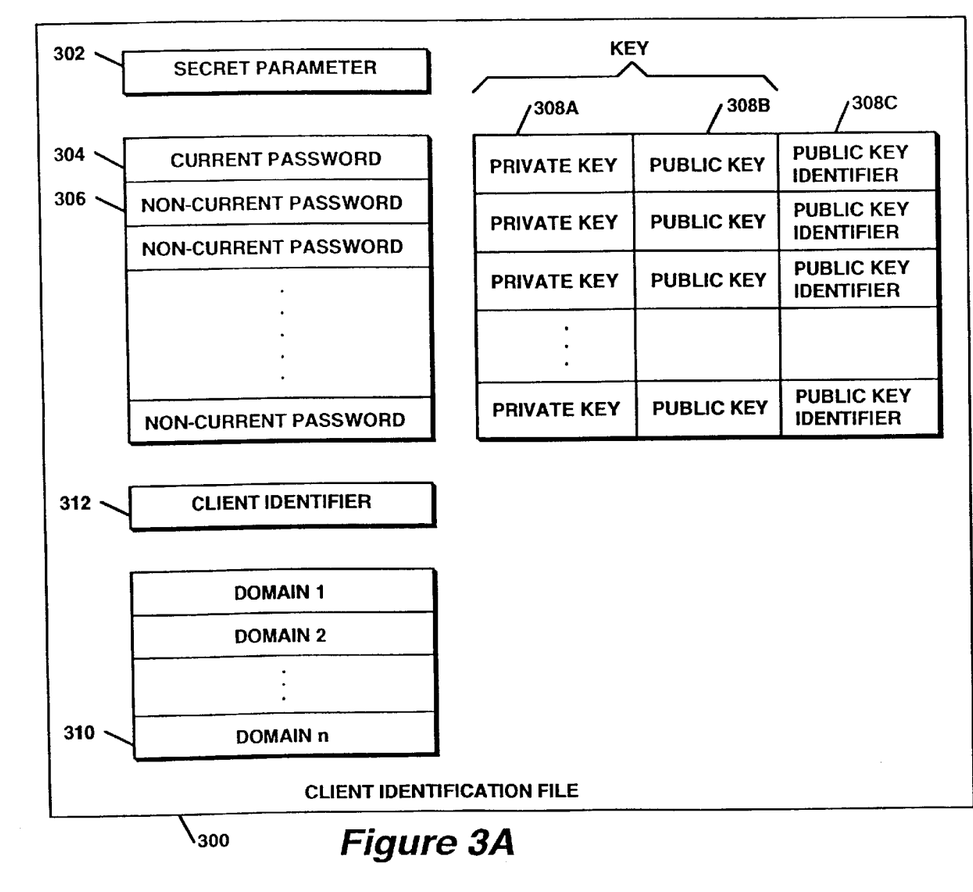
FIG. 3A illustrates conceptually the data structures of a client identification file utilized with the present invention.

Referring to FIG. 3, the data structures utilized in an exemplary embodiment of the present invention are illustrated conceptually. Specifically, an identification (ID) file 300 comprises a secret parameter 302, a current password 304, one or more noncurrent passwords 306, and one or more keys 308, each key associated with one of the passwords. ID file 300 may further include a domain list 310 and client identifier 312, as explained hereinafter. ID file 300 is created when a user is registered with a system and is updated as necessary. In an object-oriented implementation, client file 300 may be implemented as an object, with secret parameter 302, passwords 304 and 306, keys 308 and domain list 310 as attributes to the client file object. In the illustrative embodiment, passwords 304 and 306 are illustrated as being part of client ID file 300. Optionally, passwords 304 and 306 do not have to be stored as part of the client ID file 300, as illustrated hereinafter with reference to FIG. 6A, as long as the authentication information derived from or associated with a password, e.g., keys 308, are contained within client ID file 300.

Secret parameter 302 may be implemented using a high quality secret number. In the illustrative embodiment, secret parameter 302 is implemented with a private encryption key comprising several long integer numbers. One type of encryption key suitable for use as secret parameter 302 is a RSA private encryption key, adhering to the RSA data encryption standard, and which is assigned to a user at the time ID file 300 is generated. Algorithms for generating such encryption keys are known in the art and will not be described herein.

Current password 304 as well as noncurrent passwords 306 may be implemented as user-definable data such as alphanumeric character strings, or with predefined digital data such as a personal identification number (PIN), similar to that used with credit cards, phone cards, bank cards, etc. Noncurrent passwords 306 may have the same format and data type as current password 304, and typically comprise passwords which have expired, been modified by the user, or, even future passwords which are intended to be used at a point in the future.

Figure 6A:
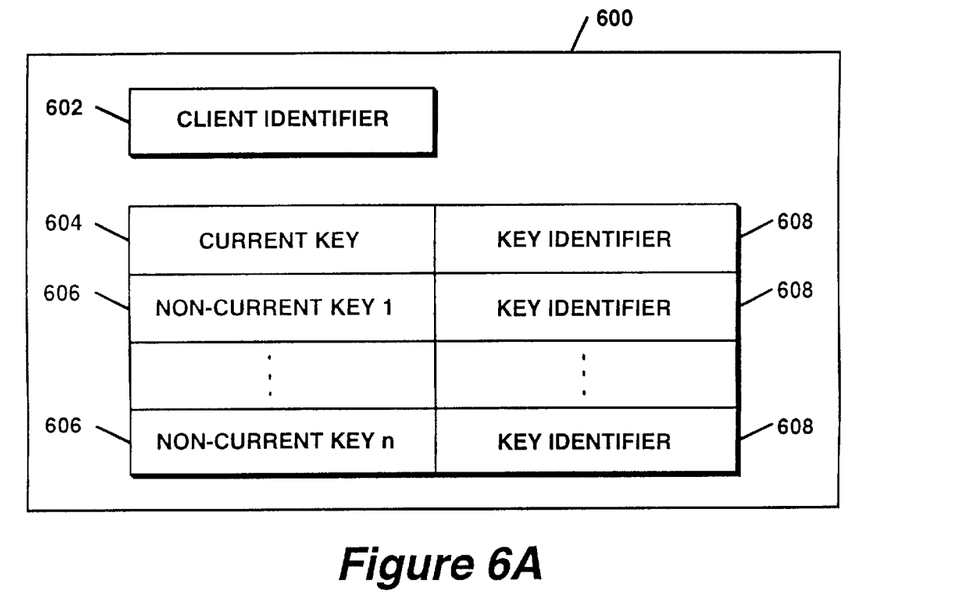
FIG. 6A and 6B illustrate conceptually removable media the data structures contained thereon in accordance with the present invention.
Figure 6B:
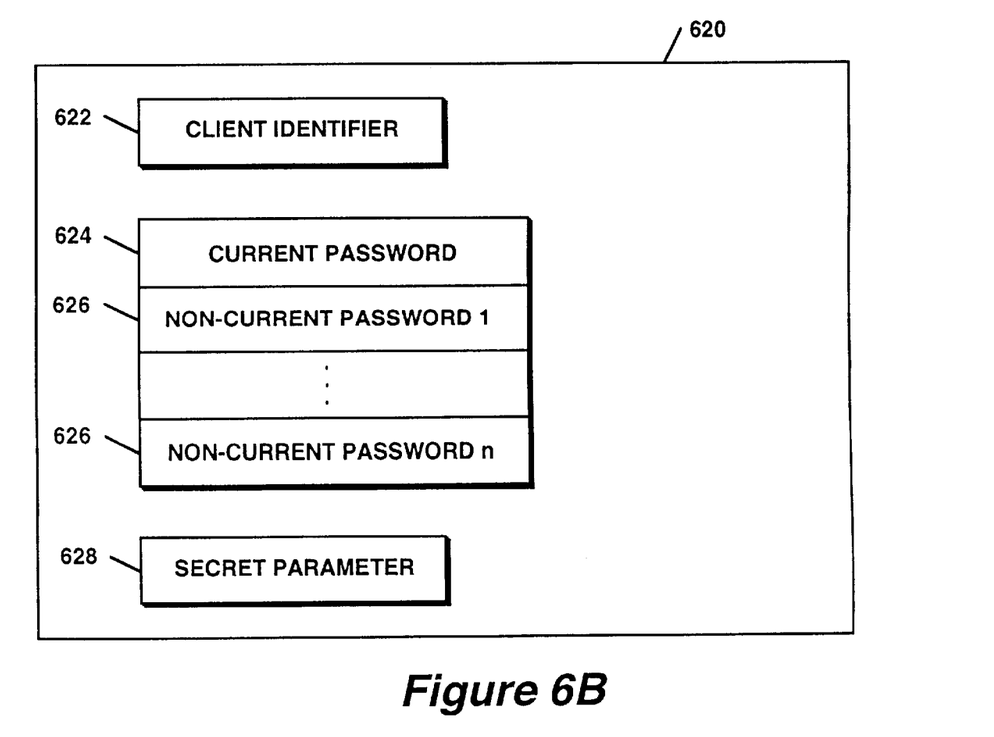

Each of passwords 304 and 306 has associated therewith a key 308. For the purposes of this disclosure, the term "key" or "key identifier" should not be interpreted as limited to the traditional understanding of a key in a cryptographic environment. Instead, the term "key" may refer to any data or authentication information which is currently used by a process to partake in an authentication protocol. For example, keys 308 may comprise a password itself, a one-way hash of a password, a public key corresponding to a private key derived from data including the password, a one-way hash of a public key corresponding to a private key derived from data including the password, a sequence number identifying password, a randomly-generated number, or other data associated with a client process. The actual format and content of the key being determined by the actual authentication protocol implemented within a specific client/server environment. Similarly, the key identifier may refer to any information which upon presentation to the client process enables the client process to determine if the appropriate key is contained within ID file 300 or medium 600 and 620, as explained hereinafter.

Figure 3B:
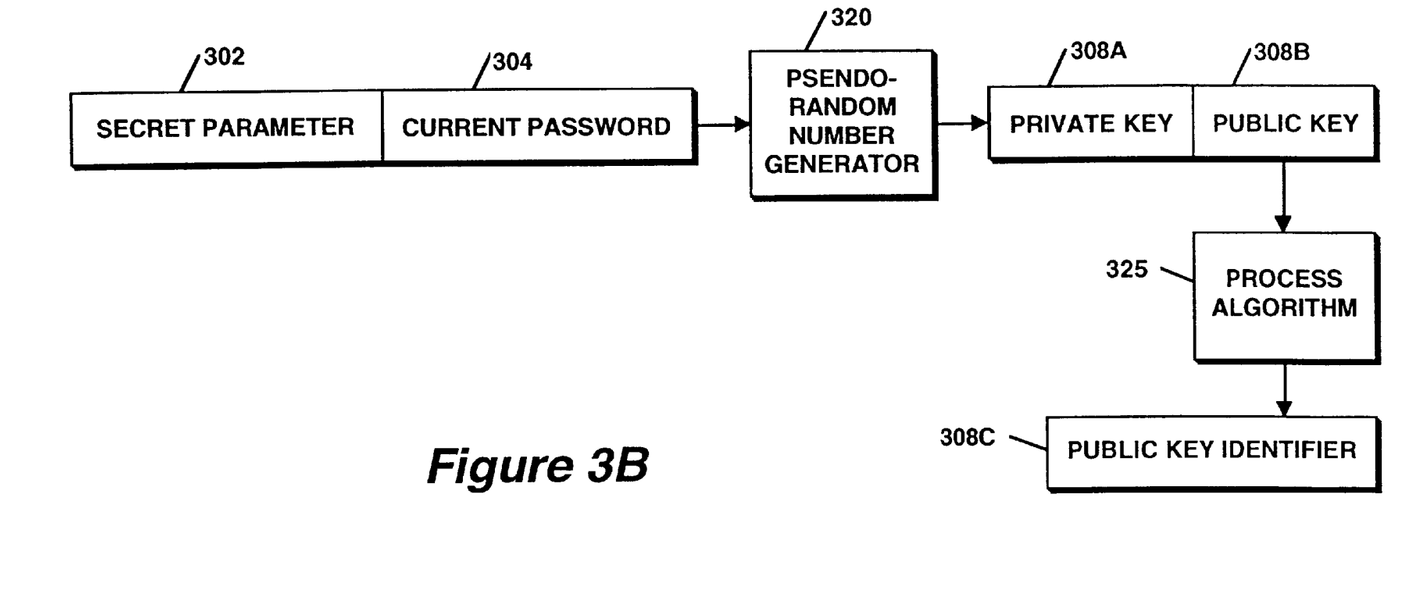
FIG. 3B illustrates conceptually the logic for generating keys and key identifiers.
Figure 4:
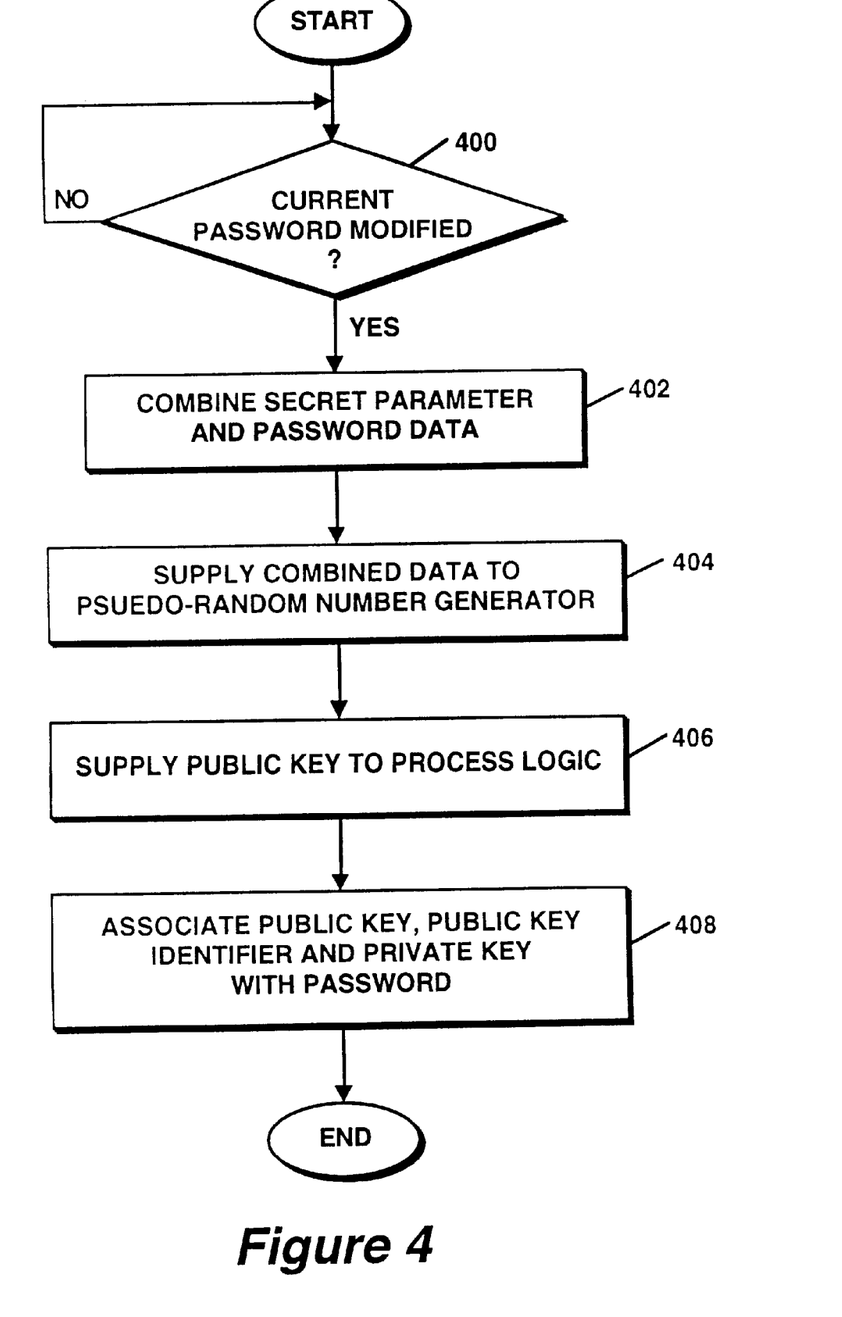
FIG. 4 illustrates schematically the logic and process for generation of a key in accordance with the present invention.

In the illustrative embodiment key 308 is generated by a process illustrated conceptually in FIGS. 3B and 4. Referring to FIG. 3B, secret parameter 302 and one of the passwords, illustrated here as current password 304, are combined, e.g., concatenated, together and supplied to a pseudo-random number generator 320. The data output generated by pseudo-random number generator 320 serves as a key 308. A pseudo-random number generator will produce the same output data for the same given input data each time. Conversely, a completely random number generator will produce, theoretically, a different data output for the same input data every time. In the illustrative embodiment, key 308 comprises aw digital value representing cryptographic key, such as a secret key, or a public/private key combination. A secret key is typically a digital value which can be used in both encrypt and decrypt data. Conversely, with a public/private key combination, the public key is used to encrypt data while the private key, typically known only to the user, is used to decrypt such public key encryptions. In FIG. 3A, key 308 is illustrated as a public/private key encryption key combination comprising a private key component 308A and a public key component 308B portions of which are stored in ID file 300.

In the illustrative embodiment, pseudo-random number generator 320 may be implemented with RC4 Symmetric Stream Cipher product, commercially available from RSA Data Security, Inc., Redwood City, Calif. As a result, generator 320 will output a RSA private/public key encryption combination the private key portion of which may be used as private key component 308A and the public key portion of which may be used as public key component 308B. It will be obvious to those reasonably skilled in the arts that other types of encryption generation techniques may be utilized to encrypt key 308, such as Digital Signature Standard (DSS), ELGamal, or other encryption technology. In addition, other pseudo-random number generator algorithms such as those compliant with the X.9 banking standard may be used for generator 320.

In addition to private key component 308A and public key 308B, a public key identifier 308C, e.g. a hash or message digest, is derived from public key component 308B. By supplying the public key component as the input to process logic 325, the output of which serves as the public key identifier 308C. Public key identifier 308C is stored along with public key component 308A, public key component 308B, and its appropriate password in ID file 300. In the illustrative embodiment, the process logic 325 may comprise an algorithm to generate a hash of public key component 308B. Alternatively, process logic 325 may comprise a message digest algorithm which generates a message digest or a secure check sum of a message digest, derived from a public key component 308B. The structured function of hashing as well as message digest algorithm suitable for use with process logic 325 are known within the arts and will not be described here and after.

FIG. 4 illustrates the method steps used in generating the key 308, as previously described. First, a determination is made as to whether or not the current password 304 has been modified, as indicated by decisional step 400. If the previous current password has been modified, secret parameter 302 is combined with the new password data which then serves as the current password 304, as illustrated by process 402. In the illustrative embodiment, secret parameter 302 is concatenated with current password 304. It will be obvious to those skilled in the art that other combinations of parameter 302 and password 304 may be utilized as the input data for the pseudo-random number generator 320, e.g., a check sum of both the parameters or the result of a logical exclusive-OR operation of both parameters. Next, the data resulting from the combination of secret parameter 302 and current password 304 is supplied to a pseudo-random number generator, as illustrated by procedural step 404. The resultant output data of the pseudo-random number generator 320 represents a key associated with the current password. As stated previously, in the illustrative embodiment, the key 308 may comprise a public/private key combination in accordance with RSA encryption technology. Next, a hash or message digest, or a secure check sum of the message digest of the public key component 308B is generated using techniques known in the art, as illustrated by procedural step 406. Next, the private key component 308A, public key component 308B and public key identifier 308C are associated with the password from which they were derived, as illustrated by procedural step 408. Such association may occur by storing the values for parameters 308A–C in the same data structure as the password from which they were derived or by using matching tab bits. The method illustrated in FIG. 4 is utilized each time the current password 304 is modified or when an initial password is defined or received. From the above disclosure it will be appreciated that the invention contemplates an ID file 300 which includes a key 308 associated with not only the current password 304 but one or more noncurrent passwords 306, as illustrated. Client identifier 312 may be implemented similar to client identifier 602 as explained hereinafter.

Authentication Process

Figure 5:
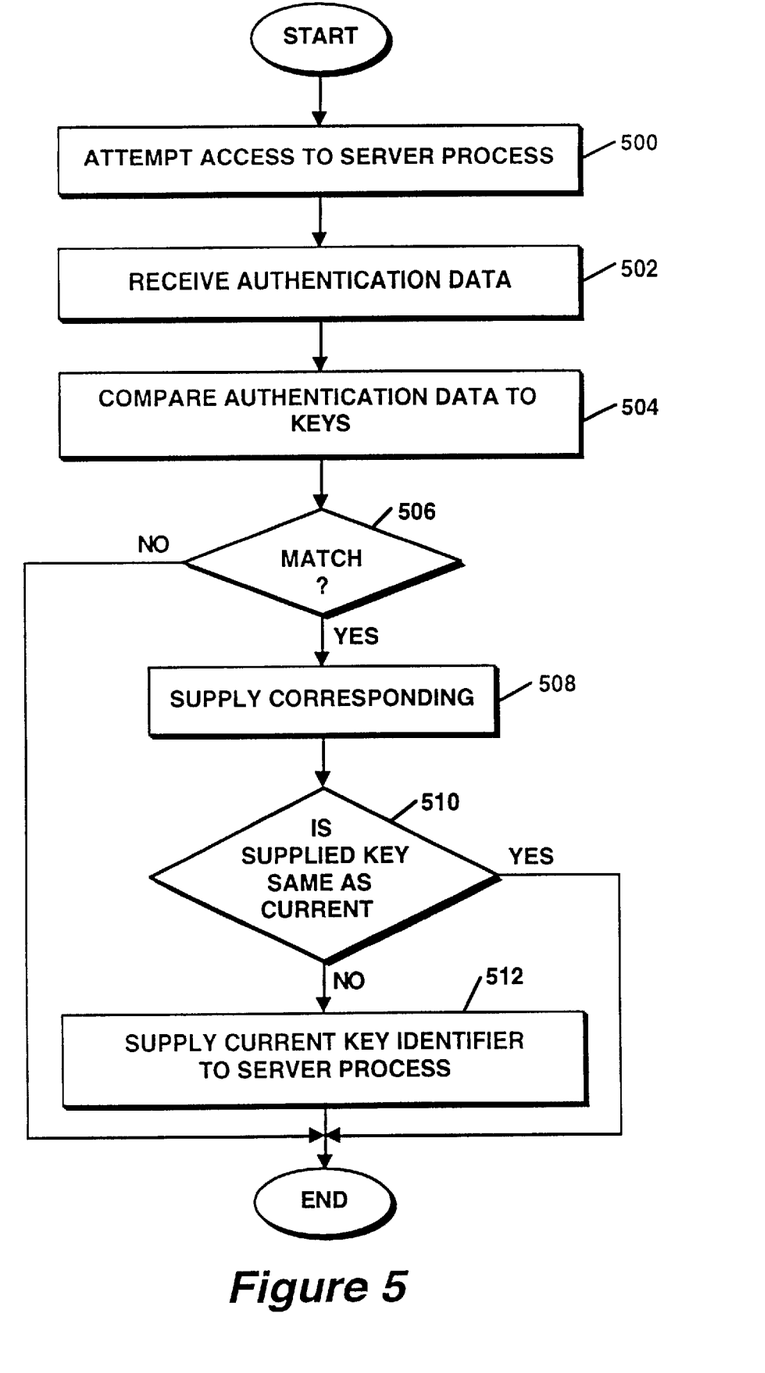
FIG. 5 is a flow chart illustrating the process of password authorization in accordance with the present invention.

FIG. 5 illustrates a process of password authentication in accordance with the present invention. For the sake of illustration, assume a scenario in which client process 210 attempts access to secure server process 216. First, client process 210 forwards an identifier of the client process, such as the user name, to server process 216. Upon receipt of the user name, process 216 will search its accompanying database 216A, utilizing the user name as an index to locate the corresponding public key identifier. If found, server process 216 then transmits to client process 210 the public key identifier, e.g. a hash of the public key associated with client process 210, and a randomly generated number to identify the transmission. Client process 210 receives the public key identifier, as illustrated by procedural step 502, and compares the public key identifier with public key identifiers 308C in ID file 300, as illustrated by procedural step 504. If the public key identifier received from process 216 does not match any of the public key identifiers 308C stored within ID file 300, the attempt to access server process 216 fails and the authentication process terminates, as illustrated in FIG. 5. Alternatively, if a match does occur, as illustrated by decisional block 506, client process 210 transmits the public key component 308B corresponding to the public key identifier 308C which matched the public key identifier received from server process 216, as illustrated by procedural step 508. Upon receiving the public key component 308B from client process 210, server process 216 will generate a hash of the public key component and compare such hash with the public key identifier previously transmitted to client process 210. If a match occurs, the client process is authenticated.

Client process 210 next determines whether the public key component 308B forwarded to server process 216 was associated with the current password 304, as illustrated by decisional block 510. If so, client process 210 takes no further action since server process 216 has the most current public key identifier associated with the client process. Alternatively, if the public key component 308B forwarded to server process 216 was not associated with current password 304, client process 210 will then transmit, preferably in a seamless manner, to server process 216, the public key identifier 308C associated with current password 304, as illustrated by procedural block 512. Thereafter, the process ends since secure server process 216 will again have the public key identifier associated with the then current password for client process 210.

The above-described process assumes that client process 210 will have an initial password or authentication information immediately upon registration with the computer system, and, that server process 216, as well as the other servers within the same domain, similarly receive authentication data sufficient to execute an authentication protocol in which the client process proves knowledge of its authentication information. In the illustrative embodiment, such default initialization of the client and server processes may be performed by a system administrator which assigns, by default, an initial password or authentication information to the client process 210 and posts the complementary authentication information to server process 216 or another server within the same domain so that the server will receive information sufficient to allow the client process to prove knowledge of the password.

Multiple Server Updating

In accordance with another aspect of the invention, once a secure server process 216 has received the current information associated with client process 210, server process 216 may share such information with server processes 218 and 220 over the network. In the illustrative embodiment, servers 216, 218 and 220 each maintain a directory service database 216A, 218A, and 220A, respectively, as illustrated in FIG. 2, which may be updated copies of the same database or different pieces of a distributed database, or even a hybrid combination thereof. In the illustrative embodiment, it is contemplated that servers are organized into logical groups or "domains" which have or share a common directory services database. Accordingly, providing one server process in a domain with the current client process information results in all server processes in the domain being eventually updated as the directory service database is updated. Such an updating process among a number of server processes in a domain may be implemented using an administrative process whereby a secure server process, for example server process 216, receives a new key identifier from client process 210 and posts a message to a master replica holder, i.e. another designated server with in the domain, for example server process 218. Server process 218 then copies the new key identifier value to its master replica of the directory service database and ultimately distributes the information to the other servers in the domain during the normal process in which the directory service database in updated. In such a system, a time gap may exist from the time in which a new password-derived key identifier is supplied to one server process in the domain until the other server processes in the domain are similarly updated.

Optionally, ID file 300 may include a domain list 310 indicating the domains to which its current key identifier has been presented. Assuming that server processes 216, 218, and 220 are in the same domain and that processes 216 and 220 replicate to process 218, if client process 210 has already provided server process 216 with its current public key identifier, client process 210 may optionally not provide server process 220 with its public key identifier, since server process 220 will eventually be updated by server process 218. Before providing the current key identifier to a server process to which it is authenticating, client process 210 checks domain list 310 to determine if any server from the same domain has already received such information, if so step 512 may be skipped for efficiency. Otherwise client process 210 records in domain list 310 the domain of the server to which it just authenticated.

Portable Identification File Mechanism

In accordance with another aspect of the invention, a portable medium containing a subset of the data contained in the client ID file 300 is illustrated in FIGS. 6A and 6B. FIG. 6A illustrates a computer usable media 600 having stored thereon a client identifier 602, a current key 604, and one or more current noncurrent keys 606. In addition, a key identifier 608 is associated with each key. In the illustrative embodiment, medium 600 may be implemented with any portable storage medium capable of both storing data thereon and interfacing with a computer system. For example, medium 600 may comprise a CD ROM, a magnetic diskette, a card similar to a bank or credit card having the data stored on a magnetic strip thereof, a PCMCIA card adhering to the PCMCIA Standard, a SMART card adhering to the ISO SMART card standard, a smart disk, a dongel, rings or keys having memory integrated thereon, or any other magnetic, semiconductor, optical or other memory technology in which data is capable of being stored.

Client identifier 602 may comprise any data useful in identifying client process, such as a user name, or client identification number, in binary, alpha numeric or other data format. Current key 604 and noncurrent key 606 may be implemented similar to keys 308 as previously described with reference to FIG. 3A. In the illustrative embodiment, key identifiers 608 are similar to key identifier 308C. Current key 604 and noncurrent key 606 is similar to keys 308 of FIG. 3. The method for generating keys 604 and 606 are similar to that described with reference to FIGS. 3B and 4, as previously described. In the illustrative embodiment, this process occurs through functionality embodied on a computer system which is capable of writing data to medium 600.

Any of server processes 216, 218, or 220 of FIG. 2 may serve as a computer system suitable for use with medium 600. As described previously, each of the server processes of FIG. 2 may be implemented using a CD ROM drive 146 and diskette drive 141 for receiving CD ROM 147 and magnetic 142, respectively. In addition, computer system 100 may be configured to include peripheral interfaces for PCMCIA cards, magnetic card readers, or other peripheral devices.

Figure 7:
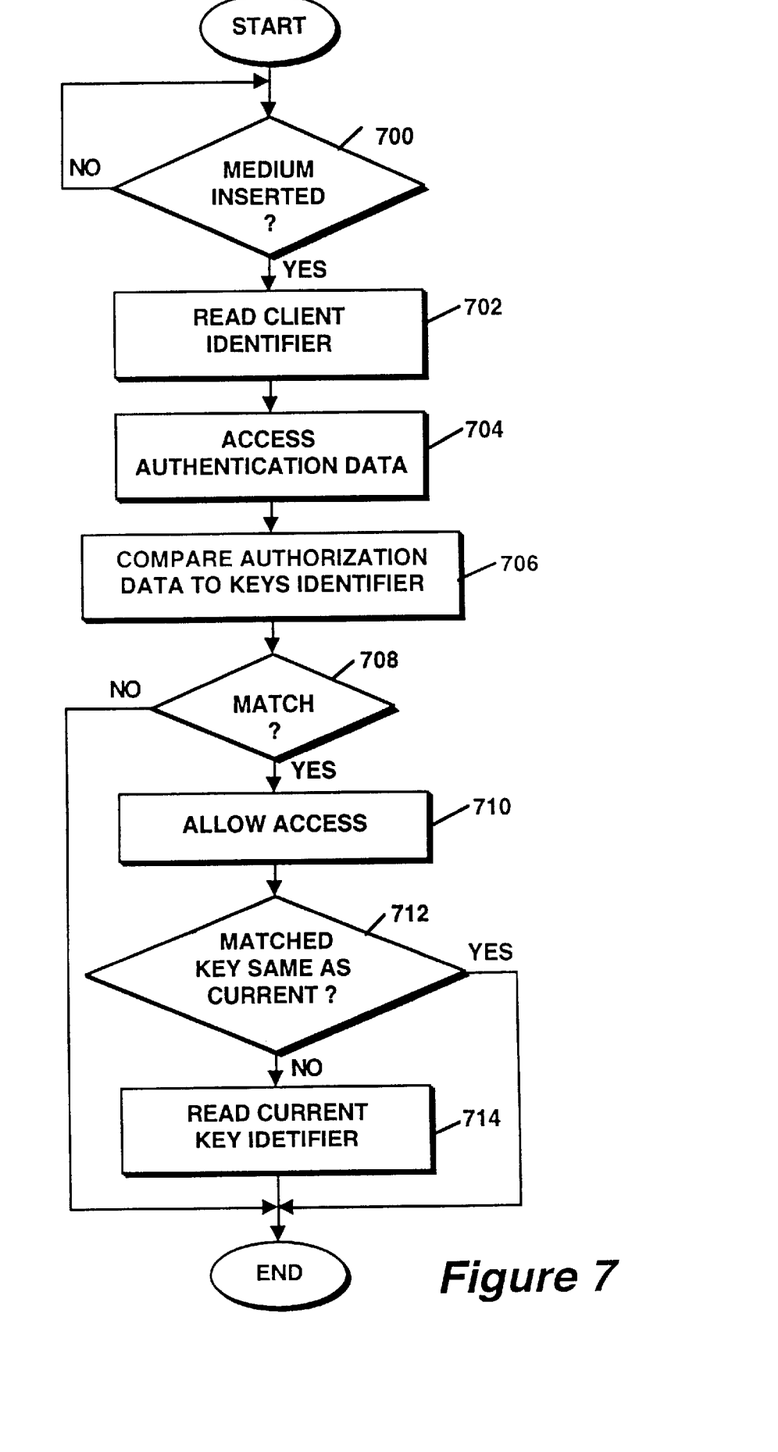
FIG. 7 is a flow chart illustrating the process of password authorization in accordance with the present invention.

Using medium 600, the process of authentication occurs as illustrated by the flow chart of FIG. 7. Assuming a scenario in which a user possessing medium 600 is trying to access the computer network through server process 216, upon insertion of medium 600, server process 216 detects the presence of medium 600, as illustrated by decisional step 700, and reads the client identifier 602 from medium 600, as illustrated by procedural step 702. Server process 216 uses the client identifier information as an index into a database 216A which contains authentication data corresponding multiple client process, as illustrated by procedural step 704. Next, server process 216 successively reads key identifiers 608 from medium 600 and compares them to the authorization data associated with the client process, as illustrated by procedural step 706. If a match occurs, as illustrated by decisional step 708, access to server process 216 is authorized, as illustrated by procedural step 710. Next, the server process determines whether the matched key identifier 608 is the current key identifier, as illustrated by decisional step 712. If so, the process ends. Otherwise, server process 216 reads the current key identifier into database 216A, as illustrated by procedure 712, after which, the process terminates. In an alternative embodiment, in step 702, the server process may read instead of the key identifier 608, the actual keys 604 or 606 and, utilizing process logic similar to process logic 325 of FIG. 3B, generate a key identifier 608 within the server process which may then be compared with the authentication data of database 216A.

An alternative embodiment of medium 600 is illustrated in FIG. 6B. Specifically, a medium 620, implemented similar to medium 600, has stored thereon a client identifier 622, a current password 624, and one or more noncurrent passwords 626. In addition, medium 620 has stored thereon a secret parameter 628, similar to secret parameter 302 of ID file 300. Current password 622 may be implemented similar to current password 304 of ID file 300 while noncurrent password 626 may be implemented to similar to noncurrent passwords 306 of ID file 300. Client identifier 622 is similar to client identifier 602 of FIG. 6A. In the illustrative embodiment, the functionality for receiving secret parameter 628 and passwords 624 and 626 may be embodied on a computer system such as process 210 of FIG. 2 which is capable of writing such data to medium 620.

The interaction of medium 620 with a computer system is similar to that previously described above with reference to medium 600, however, server process 216 performs the key generation process, described with reference to FIG. 3B and FIG. 4 to determine whether or not the authorization data is stored in database 216A is associated with the current password or any of the noncurrent passwords. If so, the client process identified by medium 620 is allowed access to the secure server process 216 and the server process may seamlessly update itself with the current data from medium 620.

Figure 8:
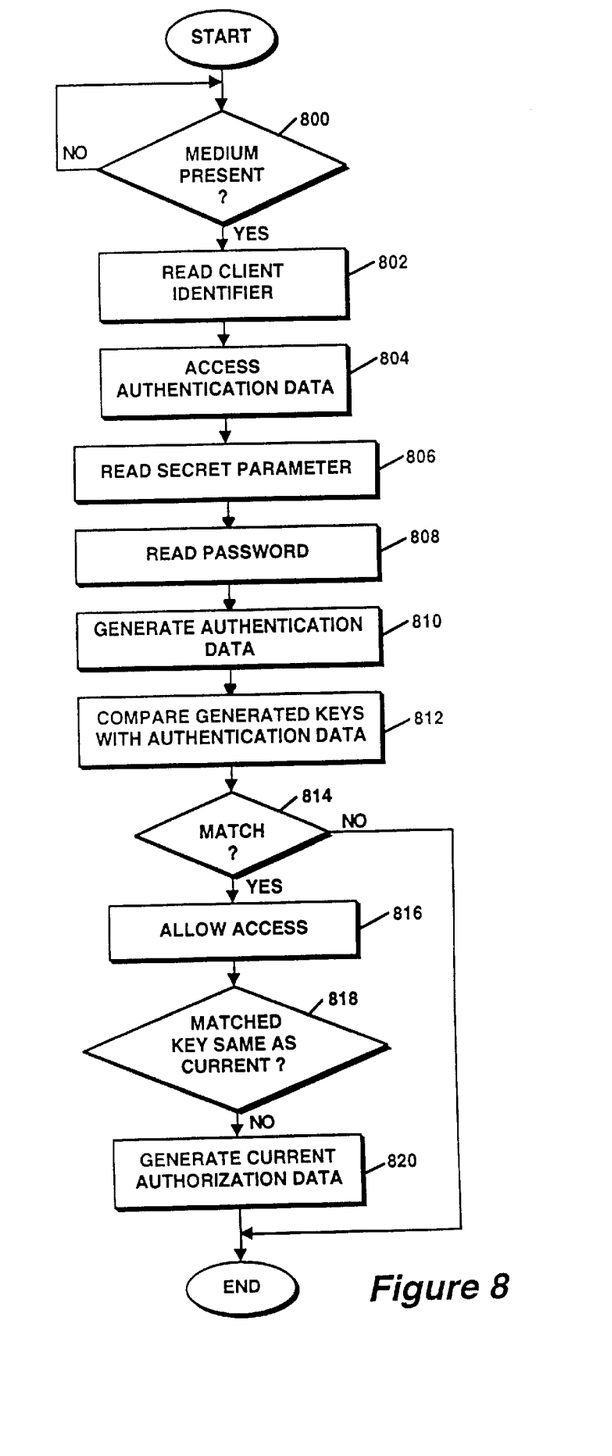
FIG. 8 is a flow chart illustrating the process of password authorization in accordance with the present invention.

Specifically, using medium 620, the process for authentication occurs as illustrated by the flow chart of FIG. 8. Again, assuming a scenario in which a user possessing medium 620 is trying to access the computer network through server process 216, upon insertion of medium 620, into the appropriate peripheral device, server process 216 detects the presence of medium 620, as illustrated by decisional step 800. Next, server process 216 reads client identifier 622 from medium 620 as illustrated by procedural step 802, and uses the client identifier information as an index into database 216A which contains authentication data corresponding to multiple client processes, as illustrated by procedural step 804. Next, server process 216 reads secret parameter 628 from medium 620, as illustrated by procedural step 806. Next, server process 216 reads one of the passwords 624 or 626, as illustrated by procedural step 808, and, utilizes secret parameter 628 and the read password 624 or 626 to generate authentication data, i.e., a key or key identifier, as illustrated by procedural step 810. In the illustrative embodiment, such a generation process may be that as described with reference to FIG. 3B and the process illustrated in the flowchart of FIG. 4. Specifically, the secret parameter and password are used to seed a pseudo-random number generator, similar to generator 320 of FIG. 3B, which generates a key which itself may serve as an authentication data or may be further processed through logic, similar to logic 325 of FIG. 3B, to generate a key identifier. Next, the generated key is compared with the authentication data from database 216A, as illustrated by procedural step 812. If a match occurs, as illustrated by decisional step 814, access to server process 216 is allowed, as illustrated by procedural step 816. If no match occurs, the process ends. It will be obvious to those reasonably skilled in the arts that the process for generating keys from the passwords contained on medium 620 and comparing such key to the authentication data may occur in a successive, iterative manner until a match occurs or all keys for all of the password data contained on medium 620 have been generated and compared to the authentication data in database 216A. Next, server process 216 determines whether the key which matched the authentication data in database 216 was associated with the current password, as illustrated by decisional step 818. If so, the process ends. Otherwise, server process 216 reads the current password 624 from medium 620 and generates, using the previously-described method, the key or other authentication data associated with the current password and stored such authentication data in database 216A, as illustrated by procedural step 820, after which the process terminates.

A software implementation of the invention may comprise a series of computer instructions either fixed on a tangible medium, such as a computer readable media, e.g. diskette 142, CD-ROM 147, ROM 115, or fixed disk 152 of FIG. 1A, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. For example, the methods of the invention may be achieved in either all software implementations, using the appropriate processor instructions, or in hybrid implementations which utilize a combination of hardware logic and software logic to achieve the same results. Such modifications to the inventive concept are intended to be covered by the appended claims.

What is claimed is:

1. In a client process capable of attempting access to one or more server processes, an apparatus for enabling authentication of a password which is changed from time to time, the apparatus comprising:
    a. identification logic configured to maintain a plurality of keys associated with the client process, each of the keys associated with a password, one of the keys being designated as current and derived from a current password that is in use, other of the keys designated as non-current and derived from non-current previously-used passwords;
    b. response logic configured to allow access to a server process if any one of the current and non-current keys corresponds to authentication data with which the server process challenged an access attempt by the client process; and
    c. update logic configured to provide a current key identifier to the server process, if the authentication data did not correspond to the current key.

2. The apparatus of claim 1 wherein the identification logic further comprises:
    a.1 password logic configured to associate with the client process, a plurality of passwords, one of the passwords designated as a current password.

3. The apparatus of claim 2 wherein the identification logic further comprises:

a.2 key generation logic responsive to one of the passwords and configured to generate a key at least partially derived from one of the passwords.

4. The apparatus of claim 3 wherein the generation logic further comprises:
    a.3 identifier generation logic responsive to one of the keys and configured to generate a key identifier at least partially derived from the key.

5. The apparatus of claim 3 wherein the key generation logic comprises:
    a.2.1 cryptographic logic configured to generate a cryptographic key at least partially derived from one of the passwords.

6. The apparatus of claim 5 wherein the key comprises a cryptographic key combination comprising a private key component and a public key component.

7. The apparatus of claim 6 wherein the authentication data comprises a public key identifier and wherein the update logic comprises:
    c.1 public key logic configured to respond to the server process with a public key corresponding to the public key identifier of the authentication data.

8. The apparatus of claim 7 wherein the update logic comprises:
    c.2 public key identifier logic configured to supply a public key identifier associated with the current password, if the public key identifier of the authentication data corresponds to other than the current password.

9. The apparatus of claim 1 wherein the server process is operatively coupled to a second secure server process and wherein the server process provides the current key identifier to second server process.

10. A method of authenticating a password which is changed from time to time in a computer system, the computer system having at least first and second processes executable on the computer system, the second process requiring authentication to gain access thereto by the first process, the method comprising the steps of:
    a. associating with the first process a plurality of keys, one of the keys being designated as current and derived from a current password that is in use, other of the keys designated as non-current and derived from non-current previously-used passwords, each of the keys having a key identifier associated therewith;
    b. presenting one of the keys to the second process, the presented key corresponding to a key identifier with which the second process challenged the first process, the second process allowing access by the first process if the presented key is any of the current and non-current keys and corresponds to authentication data in the second process; and
    c. supplying to the second process a key identifier associated with the current key for use in subsequent challenges, if the second process challenged with a key identifier corresponding to other than the current key.

11. The method of claim 10 wherein step (a) comprises the step of:
    a.1 associating with the first process, a plurality of passwords, one of the passwords designated as a current password.

12. The method of claim 11 wherein step (a) further comprises the step of:
    a.2 generating a key at least partially derived from one of the passwords.

13. The method of claim 11 wherein step (a) further comprises the step of:

a.3 generating a key identifier at least partially derived from one of the keys.

14. The method of claim 13 wherein the key comprises a secret key useable to both encrypt and decrypt data.

15. The method of claim 13 wherein the key comprises a cryptographic key combination having a private key component and a public key component.

16. The method of claim 15 wherein step a.3 further comprises the step of:

a.3.1 generating a public key identifier at least partially derived from the public key component of the cryptographic key combination.

17. The method of claim 16 wherein the authentication data comprises a public key identifier and wherein step (c) comprises:

c.1 responding to the server process with a public key corresponding to the public key identifier of the authentication data.

18. The method of claim 16 wherein step (c) further comprises:

c.2 supplying a public key identifier associated with the current password, if the public key identifier of the authentication data corresponds to other than the current password.

19. The method of claim 10 wherein the second process is operatively coupled to a third process and wherein the second process distributes to the third process the key identifier associated with the current key.

20. The method of claim 10 wherein step (c) further comprises the step of:

c.1 determining whether the server process is logically associated with another server process to which the client process has previously supplied the key identifier associated with the current key.

21. A computer program product for authenticating a password which is changed from time to time in a computer system, the computer system having at least first and second processes executable on the computer system, the second process requiring authentication to gain access thereto by the first process, the computer program product comprising a computer usable medium having computer program code embodied therein, the program code comprising:

a. program code for associating with a first process, a plurality of keys, one of the keys designated as current and derived from a current password that is in use, other of the keys designated as non-current and derived from non-current previously-used passwords, each of the keys having a key identifier associated therewith;

b. program code responsive to an authorization challenge from a second process, for supplying one of the keys to the second process, the key corresponding to a key identifier with which the second process presented the authorization challenge, the second process allowing access by the first process if the supplied key is any of the current and non-current keys and corresponds to authentication data in the second process; and c. program code for supplying to the second process a key identifier associated with the current key for use in subsequent challenges, if the second process presented a key identifier corresponding to other than the current key.

22. The computer program product of claim 21 wherein the program code for associating further comprises:

program code for associating with the client process, a plurality of passwords, one of the passwords designated as a current password.

23. The computer program product of claim 22 wherein the program code for associating further comprises:

program code for generating a key at least partially derived from one of the passwords.

24. The computer program product of claim 21 wherein the program code for associating further comprises:

program code for generating a key identifier at least partially derived from one of the keys.

25. The computer program product of claim 21 wherein the key comprises a cryptographic key combination having a private key component and a public key component.

26. The computer program product of claim 21 wherein the program code for associating further comprises:

program code for determining whether the second process is logically associated with another process to which the first process has previously supplied the key identifier associated with the current key.

* * * * *